United States Patent [19]

Harig et al.

[11] Patent Number: 5,024,630
[45] Date of Patent: Jun. 18, 1991

[54] HARVESTER THRESHER

[75] Inventors: Horst Harig, Marienfeld; Hermann Kersting, Oelde/Lette, both of Fed. Rep. of Germany

[73] Assignee: CLAAS OHG, Harsewinkel, Fed. Rep. of Germany

[21] Appl. No.: 530,737

[22] Filed: May 29, 1990

[30] Foreign Application Priority Data

May 31, 1989 [DE] Fed. Rep. of Germany ....... 3917605

[51] Int. Cl.⁵ .................. A01F 7/00; A01F 12/18; A01D 41/12
[52] U.S. Cl. ...................................... 460/21; 56/14.6; 460/66; 460/119
[58] Field of Search .................... 56/14.6; 460/21, 22, 460/13, 66–69, 119, 150, 85

[56] References Cited

U.S. PATENT DOCUMENTS

| | | | |
|---|---|---|---|
| 4,150,525 | 4/1979 | De Busscher et al. | 460/85 X |
| 4,306,572 | 12/1981 | Campbell et al. | 460/69 |
| 4,846,198 | 7/1989 | Carnewal et al. | 460/68 X |

Primary Examiner—Steven J. Novosad
Attorney, Agent, or Firm—Michael J. Striker

[57] ABSTRACT

A harvester thresher includes a chassis, a housing, a threshing mechanism operating in accordance with the principle of a tangential flow, straw shaking means, and a threshing and separating unit located after the straw shaking means in the housing including a rotor and a casing, the threshing and operating unit operating in accordance with the principle of an axial flow and formed as a separate unit which is supported in the housing exchangeably so that it can be exchanged by another structural unit.

13 Claims, 2 Drawing Sheets

5,024,630

HARVESTER THRESHER

BACKGROUND OF THE INVENTION

The present invention relates generally to a harvester thresher. More particularly, it relates to such a harvester thresher which has a chassis, a housing, a threshing mechanism operating in accordance with the principle of a tangential flow and including a threshing drum and a threshing basket, straw shakers located after the threshing mechanism and provided with a return bottom and a sieve device underneath, and a threshing and separating device located after the straw shakers in the housing, composed of a rotor and a casing and operating in accordance with the principle of axial flow.

Harvester threshers of the above mentioned general type are known in the art. Such harvester threshers are disclosed in some proposals of the applicant. The existing harvester thresher of this type can be further improved as will be explained hereinbelow.

SUMMARY OF THE INVENTION

Accordingly, it is an object of the present invention to provide a harvester thresher of the above mentioned general type, which is a further improvement over existing harvester threshers.

More particularly, it is an object of the present invention to provide a harvester thresher of this type with a flexible production or especially flexible mounting of a harvester thresher so that when desired a harvester thresher can be delivered in which the threshing and separating unit operating in accordance with the principle of the axial flow can be dispensed with. On the other hand, it is also an object of the present invention to provide such a harvester thresher in which the conventional shaker/harvester thresher can be equipped with the associated threshing and separating unit without high mounting costs.

In keeping with these objects and with others which will become apparent hereinafter, one feature of the present invention resides, briefly stated, in a harvester thresher of the above mentioned general type in which the threshing and separating device operating in accordance with the principle of the axial flow and including a rotor and a casing is formed as a separate structural unit and supported in the housing of the harvester thresher so that it can be exchanged by another structural unit.

When the harvester thresher is designed in accordance with the present invention, it achieves the above mentioned objects.

In accordance with another feature of the present invention, the housing of the harvester thresher is provided at both sides for at least one upwardly open reinforcing frame for receiving the respective separate structural unit.

Still another feature of the present invention is that the structural unit has two outer supporting frames, as well as two lateral covers and one upper cover.

Still a further feature of the present invention is that the supporting frames and the separate structural units are connectable with the reinforcing frames by screws.

The separate structural unit and another structural unit exchangeable with the first one are formed identically at least with respect to their supporting frames and their mounting points.

The reinforcing frames can be formed as a right angle which is open upwardly and rearwardly.

In accordance with another feature of the present invention, each reinforcing frame of the housing of the harvester thresher has two vertically extending profile pairs and one horizontally extending profile pair which connects the vertically extending profile pairs. Both horizontally extending profile pairs are offset laterally and in direction of their height relative to one another.

Finally, the harvester thresher has a throwing out hood provided with a reinforcing frame. The reinforcing frame of the throwing out hood is connected by screwing with the rear profiles of the supporting frames of the structural unit, and also with the rear vertically extending profiles of the reinforcing frame of the housing of the harvester thresher.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
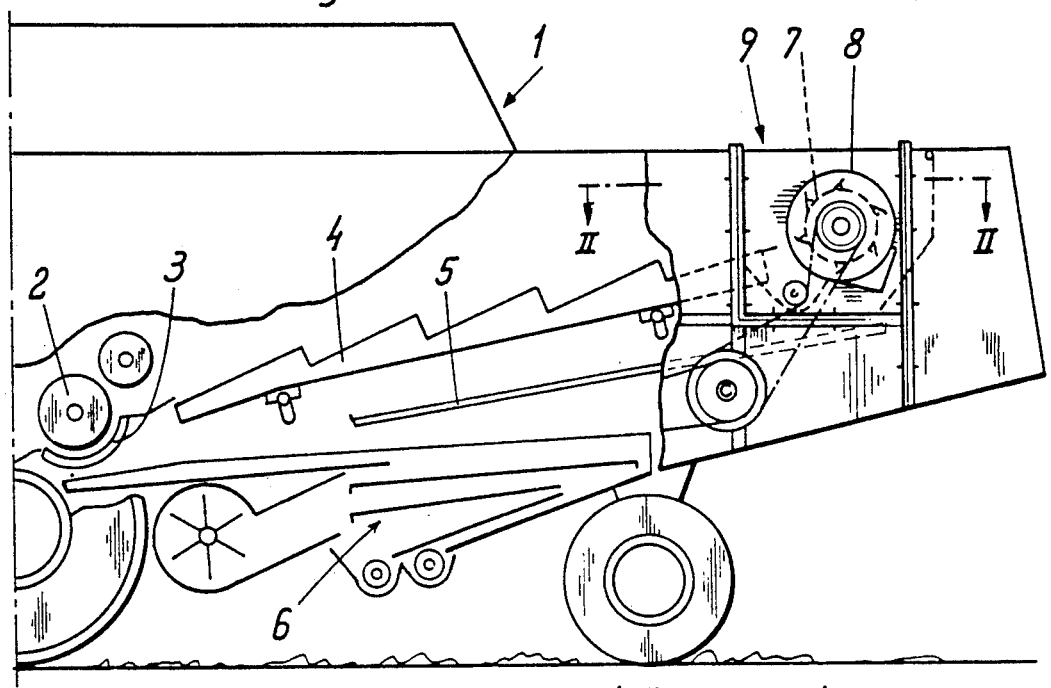
FIG. 1 is a partial side view schematically showing a harvester thresher in accordance with the present invention.
Figure 3:
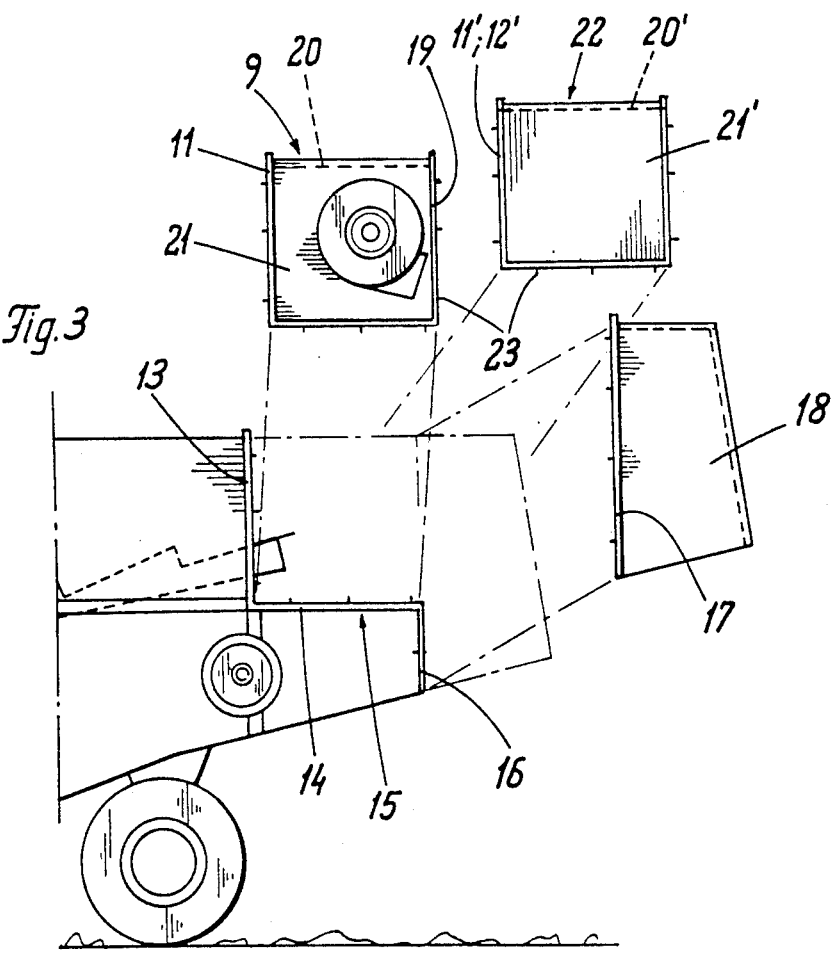
FIG. 3 is a view showing a part of the structural unit shown in FIG. 1.

A harvester thresher in accordance with the present invention is identified as a whole with reference numeral 1. It has a threshing mechanism which operates in a known manner in accordance with the principle of a tangential flow and includes a threshing drum 2 and a threshing basket 3. A straw shaker 4 follows the threshing mechanism, a return bottom 5 is located under the straw shaker 4, and a sieve device 6 is located under the return bottom 5.

A separating device is arranged after the shakers 4 and is formed as a separate structural unit 9 which includes a rotor 7 and a casing 8. The structural unit 9 extends outwardly beyond the housing of the harvester thresher at both its sides by the same distance. The casing 8 of the structural unit 9 has two outlet openings 10 in the regions extending outwardly beyond the housing of the harvester thresher.

Figure 2:
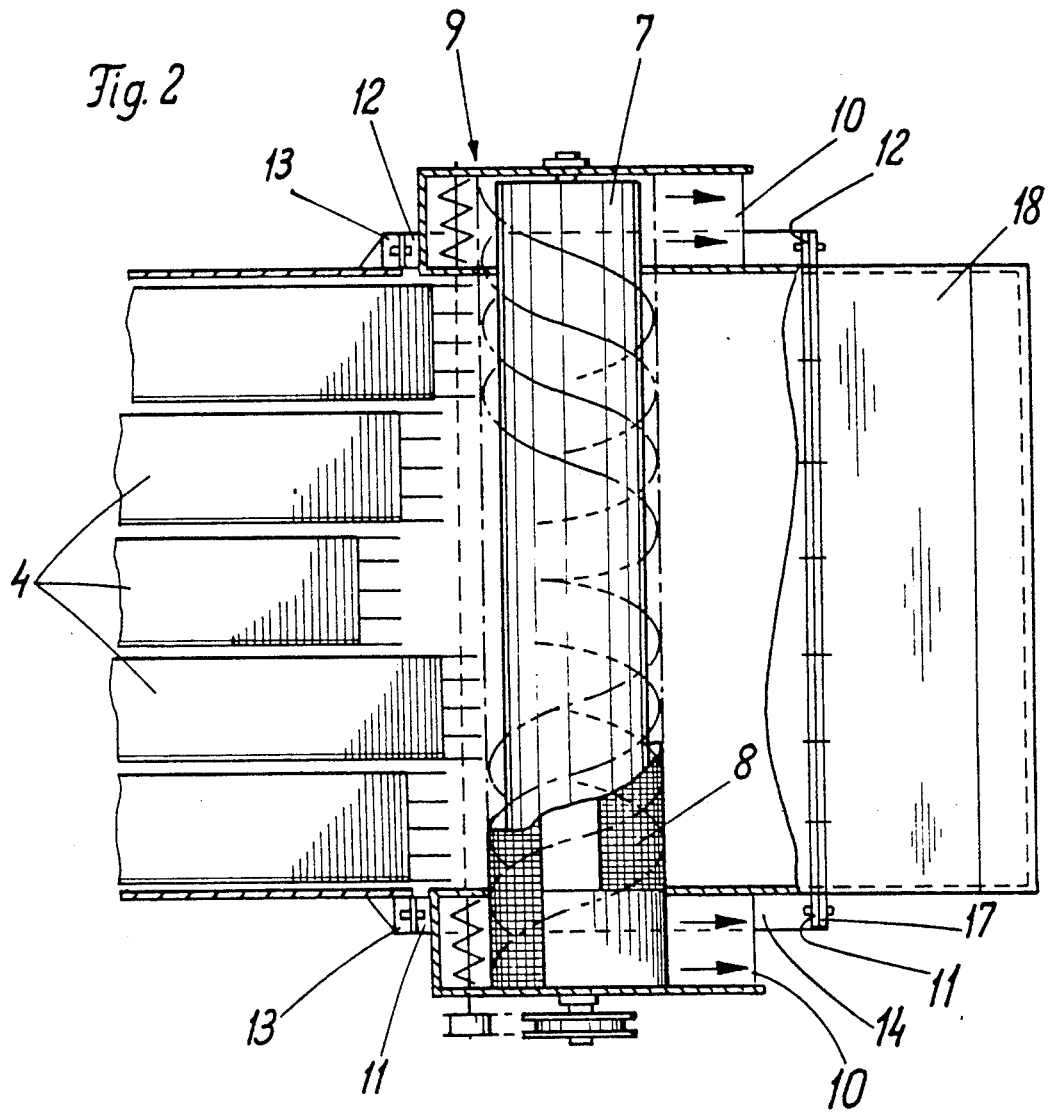
FIG. 2 is a partial plan view of the harvester thresher of the present invention, on a section taken along the line II—II of FIG. 1.

Two supporting frames 11 and 12 are welded with the casing 8 of the structural unit 9 for easy mounting. The supporting frames 11 and 12 are U-shaped, they are open upwardly and arranged at a distance from one another. In the embodiment shown in FIGS. 1 and 2 the supporting frames 11 and 12 are connected by screwing with both front vertical profiles 13 and both horizontally extending profiles 14 of two reinforcing frames 15. The reinforcing frames 15 are fixedly connected with the housing 1 of the harvester thresher at both sides.

Two downwardly extending vertical profiles are connected with both horizontally extending profiles 14. A part of a reinforcing frame 17 is connected by screws with the profiles 16 and at least partially surrounds a closing side of a discharge hood 18 to be connected with the harvester thresher. The upper part of the reinforcement frame 17 is fixedly connected by screws with rear profiles 19 of the frames 11 and 12.

While the structural unit 9 is composed of supporting frames 11 and 12 as well as an upper cover 20 and lateral covers 21, a further structural unit 22 includes elements 11', 12', 20' and 21' similar to the above mentioned elements. Both structural units 9 and 22 are formed identically with respect to their mounting points 23. In this manner one structural unit 9 can easily be exchanged with the other structural unit 22 when needed.

It will be understood that each of the elements described above, or two or more together, may also find a useful application in other types of constructions differing from the types described above.

While the invention has been illustrated and described as embodied in a harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims;

1. A harvester thresher, including a chassis; a housing; a threshing unit operating in accordance with the principle of a tangential flow; straw shaking means; and a threshing and separating unit located after said straw shaking means in said housing and operating in accordance with the principle of an axial flow so that said straw shaking means is located between said units, said threshing and separating unit being formed as a separate unit; means in said housing for supporting said separate unit exchangeably so that it can be exchanged by another structural unit.

2. A harvester thresher as defined in claim 1; and further comprising a return bottom arranged underneath said straw shaking means.

3. A harvester thresher as defined in claim 1; further comprising a sieve device arranged underneath said straw shaking means.

4. A harvester thresher, including a chassis; a housing; a threshing mechanism operating in accordance with the principle of a tangential flow; straw shaking means; and a threshing and separating unit located after said straw shaking means in said housing and including a rotor and a casing, said threshing and separating unit operating in accordance with the principle of an axial flow and formed as a separate unit; means in said housing for supporting said separate unit exchangeably so that it can be exchanged by another structural unit, said means for exchangeably supporting said structural unit including a reinforcing frame formed for receiving each of said structural units and provided at each side of said housing, said reinforcing frames being open from above.

5. A harvester thresher as defined in claim 1, wherein each of said structural units further includes two outer supporting frames.

6. A harvester thresher as defined in claim 5, wherein each of said supporting frames is provided with two lateral and one upper cover.

7. A harvester thresher as defined in claim 5, wherein said supporting frames and said structural units are connectable with said reinforcing frame; and further comprising means for connecting said supporting frames with said reinforcing frame.

8. A harvester thresher as defined in claim 7, wherein said connecting means are screw means.

9. A harvester thresher as defined in claim 7, wherein said supporting frames of said structural units have rear profiles, said reinforcing frames having vertically extending profiles; and further comprising a throwing out hood provided with a further reinforcing frame which is connected with said rear profiles of said supporting frames and with said vertically extending profiles of said reinforcing frames.

10. A harvester thresher as defined in claim 9; and further comprising means for connecting said reinforcing frame of said throwing out hood with said rear profiles of said supporting frames and said rear vertically extending profiles of said reinforcing frames.

11. A harvester thresher as defined in claim 5, wherein said structural units have mounting points and are identical with respect to said outer supporting frames and to said mounting point.

12. A harvester thresher as defined in claim 4, wherein said reinforcing frames have a shape of a right angle and are open upwardly and rearwardly.

13. A harvester thresher as defined in claim 4, wherein each of said reinforcing frames has two vertically extending profile pairs and a horizontally extending profile pair which connects said vertically extending profile pairs, said vertically extending profile pairs are offset relative to one another in a lateral direction and in a vertical direction.

* * * * *